(12) United States Patent
Marumasu (10) Patent No.: US 6,379,602 B1
(45) Date of Patent: Apr. 30, 2002

(54) METHOD OF PRODUCING OUTER COATING LAYER OF POLYMER INSULATOR

(75) Inventor: Toshiro Marumasu, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/374,062

(22) Filed: Aug. 13, 1999

(30) Foreign Application Priority Data

Aug. 17, 1998 (JP) .............................. 10-230544

(51) Int. Cl.[7] ..................... B29C 33/12; B29C 33/42; B29C 43/18
(52) U.S. Cl. .................. 264/275; 264/254; 264/271.1
(58) Field of Search ............................ 264/254, 261, 264/263, 275, 276, 271.1, 259, 319–320; 425/121, 127, 577

(56) References Cited

U.S. PATENT DOCUMENTS

| | | | | |
|---|---|---|---|---|
| 3,898,372 A | * | 8/1975 | Kalb | 174/179 |
| 4,373,113 A | * | 2/1983 | Winkler et al. | 264/254 |
| 5,702,731 A | * | 12/1997 | Hayakawa et al. | 425/125 |
| 5,723,155 A | * | 3/1998 | Kayakawa et al. | 425/116 |
| 5,783,128 A | * | 7/1998 | Ishino | 264/135 |
| 5,804,122 A | * | 9/1998 | Ishino | 264/275 |
| 5,811,049 A | * | 9/1998 | Kashiwagi | 264/263 |
| 6,019,931 A | * | 2/2000 | Kashiwagi | 264/496 |
| 6,042,771 A | * | 3/2000 | Kashiwagi | 264/275 |

* cited by examiner

Primary Examiner—Angela Ortiz
(74) Attorney, Agent, or Firm—Burr & Brown (57) ABSTRACT

A method of forming an overcoat member of a polymer insulator having a core member. The overcoat member is made of a sheath portion arranged around the core member and includes a plurality of sheds. The overcoat member is formed by using a metal mold, and during a forming operation, a spacer for maintaining a thickness of the sheath portion is arranged to a portion of the metal mold corresponding to the sheath portion.

8 Claims, 7 Drawing Sheets

METHOD OF PRODUCING OUTER COATING LAYER OF POLYMER INSULATOR

BACKGROUND OF THE INVENTION

1. Field of the Invention

The present invention relates to a method of forming an overcoat member of a polymer insulator having a core member and the overcoat member made of a sheath portion arranged around the core member and a plurality of sheds, in which the overcoat member of the polymer insulator is formed by using a metal mold.

2. Description of Related Art

Figure 7:
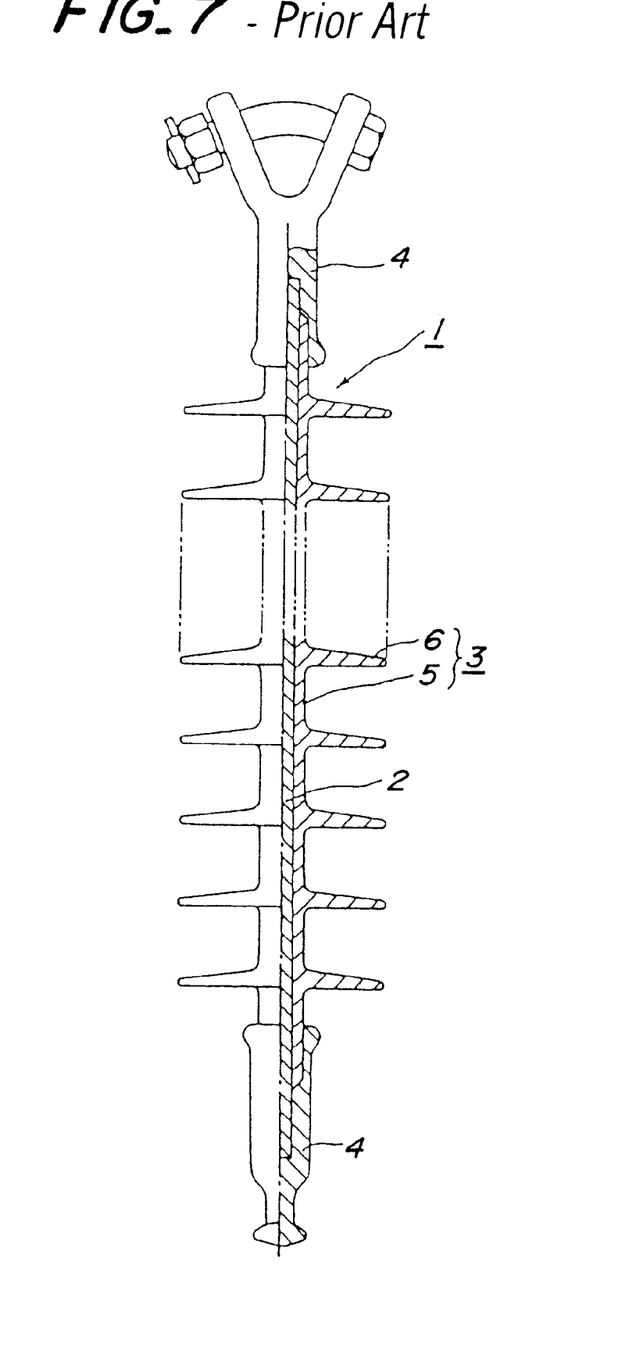
FIG. 7 is a partial cross sectional view showing one embodiment of a known polymer insulator which is also an object of the present invention.

FIG. 7 is a partial cross sectional view showing one embodiment of a known polymer insulator which is also a target of the present invention. In the embodiment shown in FIG. 7, a polymer insulator 1 comprises a solid FRP core 2 as a core member, an overcoat member 3 made of rubber such as silicon rubber arranged around the FRP core 2, and metal fittings 4 fixed to both end portions of the FRP core 2. The overcoat member 3 has a sheath portion 5 and a plurality of sheds 6.

The overcoat member 3 of the polymer insulator 1 is generally formed by a metal mold consisting of an upper mold and a lower mold. When the overcoat member 3 is formed by using the metal mold, a thickness of the sheath portion 5 is not maintained constantly even, if the FRP core 2 is eccentric. If such a polymer insulator 1 is used, the sheath portion 5 is sometimes penetrated, when a flashover due to for example an abnormal voltage of power transmission line is applied thereto. In forming operations using the metal mold such as compression forming, transfer forming, injection molding and so on, such an eccentric FRP core 2 likely occurs, and thus countermeasures are required.

Figure 8A:
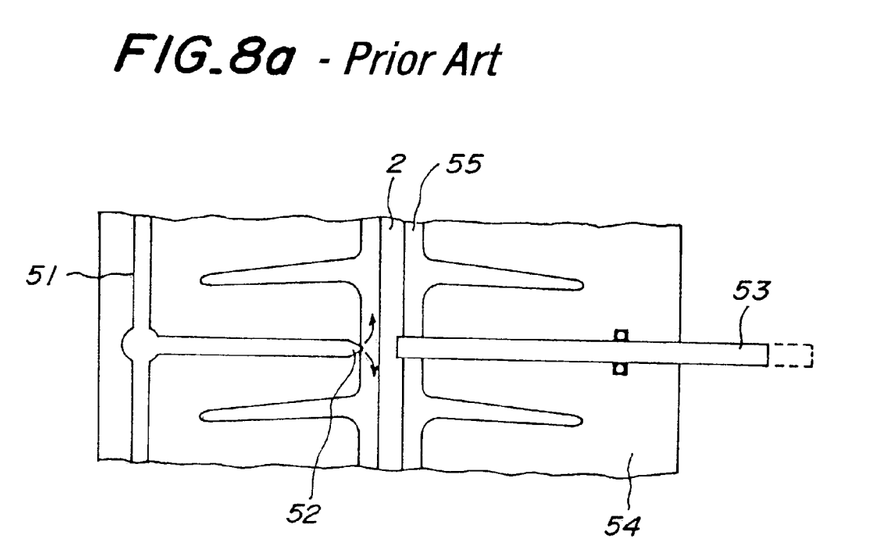
FIGS. 8a and 8b are schematic views respectively illustrating one embodiment of a known transfer forming or a known injection forming.
Figure 8B:
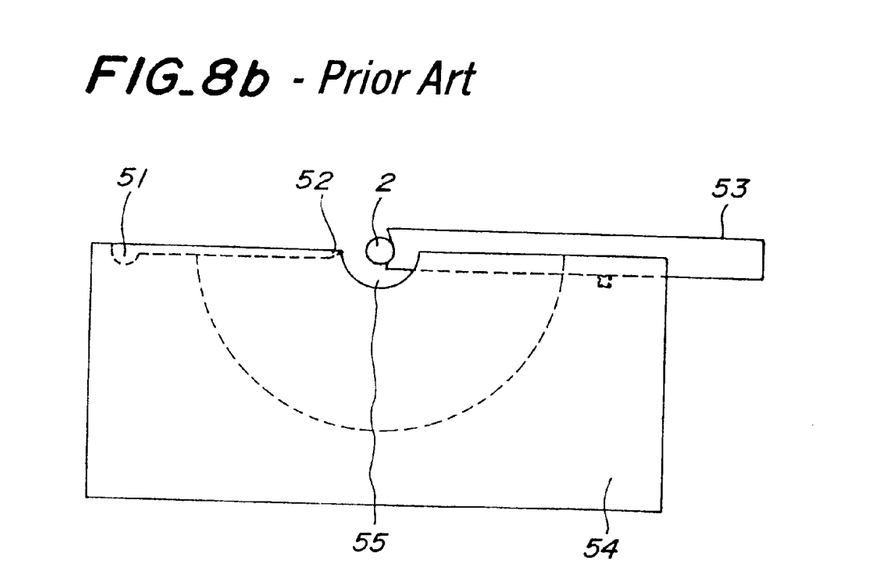
Figure 9A:
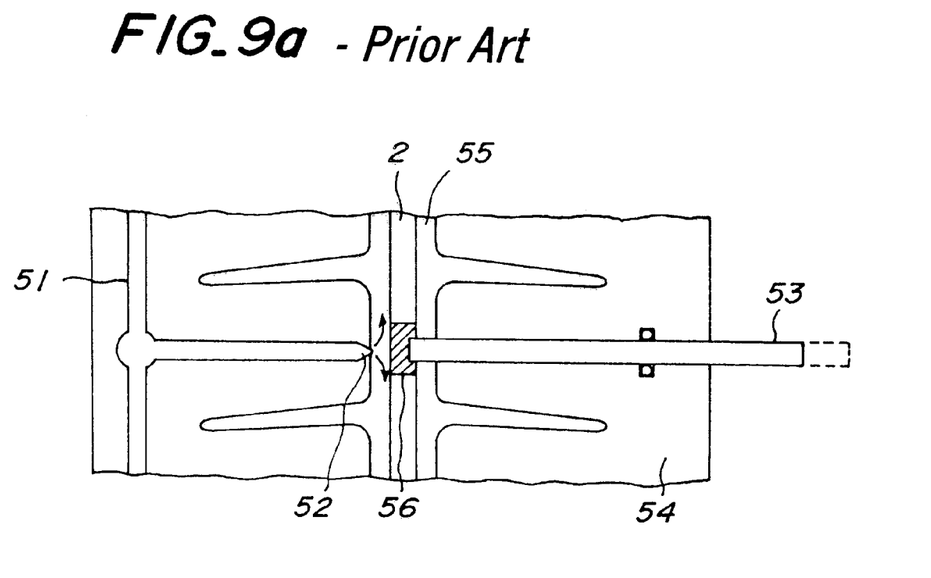
FIGS. 9a and 9b are schematic views respectively depicting another embodiment of the known transfer forming or the known injection forming.
Figure 9B:
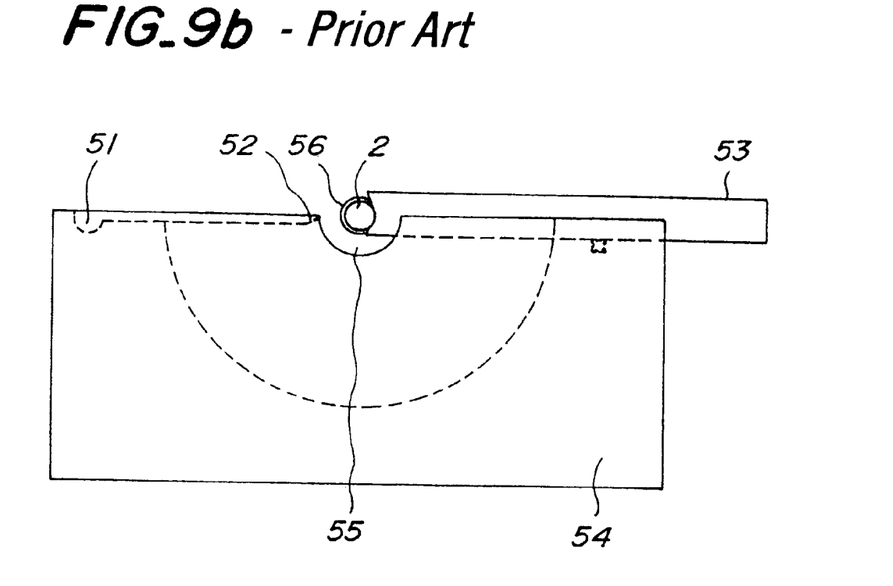

As the countermeasure in the transfer forming or the injection forming process, there is known a method, as shown in FIGS. 8a and 8b with a plan view and a front view, comprising the steps of: arranging support rod 3 for supporting the FRP rod 2 with respect to a rubber flow supplied through a runner 51 and nozzle 52; filling rubber materials in a cavity 55 of a metal mold 54 through the runner 51 and the nozzle 52 under such a condition; and removing the support rod 53 from the cavity 53 by moving the support rod 53 backward. Moreover, in order to prevent a flaw generation on the FRP core 2 by the support rod 53 when using the above method, there is known an additional method, as shown in FIGS. 9a and 9b with a plan view and a front view, comprising the steps of: winding a ring 56 around the FRP rod 2, which is made of the same rubber as that of the FRP core 2; and arranging the support rod 53 via the ring 56.

The known countermeasure mentioned above is slightly effective for preventing an eccentricity of the FRP core 2 in the injection forming and the transfer forming. However, since a primer treatment is applied to the surface of the FRP core 2 for connecting the FRP core 2 to a rubber which forms the overcoat member 3, the operation for inserting the ring 56 through the FRP core 2 likely causes an adhesion of a fouling, which prevents a connection between the FRP core 2 and the overcoat member 3, on the surface of the FRP core 2. Moreover, in the method in which the support rod 53 is directly contacted to the FRP core 2, it is likely to make a flaw on the surface of the FRP core 2.

Further, since it is necessary to form, in the metal mold 54, the support rod 53 and a construction for taking the support rod 53 in and out, there is a problem such that the metal mold construction is complicated, and thus a maintenance and an operation are also troublesome. Furthermore, the rubber is arranged around the FRP core 2, which is set between the upper mold and the lower mold. The upper and lower molds are then closed around the FRP core. The above mentioned methods in which the support rod 53 is used have a technical disadvantage and the FRP rod 2 is liable to be damaged. Therefore, the above mentioned methods are not used in the compression forming method.

SUMMARY OF THE INVENTION

An object of the invention is to eliminate the drawbacks mentioned above and to provide an easier method of forming an overcoat member of a polymer insulator which prevents an eccentricity of the core member during a forming of the overcoat member without damaging the core member.

According to the method of forming the overcoat member of the polymer insulator of the invention, an overcoat member of a polymer insulator has a core member and is made of a sheath portion arranged around the core member. The overcoat member also includes a plurality of sheds and is formed by using a metal mold, comprising the steps of arranging a spacer for maintaining a thickness of the sheath portion during a forming operation to a portion of the metal mold corresponding to the sheath portion.

In the present invention, the spacer for maintaining a thickness of the sheath portion during a forming operation, which is arranged to a portion of the metal mold corresponding to the sheath portion, can prevent an eccentricity of the core member during a forming operation, so that it is possible to perform and overcoat member forming under such a condition that a thickness of the sheath portion is maintained constantly even. The spacer is preferably made of the same rubber as that of the overcoat member, and which is preferably projected inward in a cavity of the metal mold for forming the sheath portion under such a condition that the metal mold is set. The method according to the invention can be applied to all the known forming methods. However, if the method according to invention is especially applied to a compression forming, it is possible to achieve constructions such that a tip portion of the spacer is moved in response to a moving speed of the core member and that the tip portion of the spacer is constructed by a spacer head which can waggle its neck, so that it is a preferred embodiment.

DESCRIPTION OF THE PREFERRED EMBODIMENT

At first, a polymer insulator which is an object of the present invention has the same construction as that of a polymer insulator 1 previously explained with reference to FIG. 7 as the known polymer insulator. That is to say, the polymer insulator 1 comprises a solid FRP core 2 as a core member, an overcoat member 3 made of rubber such as silicon rubber arranged around the FRP core 2, and metal fittings 4 fixed to both end portions of the FRP core 2. The overcoat member 3 has a sheath portion 5 and a plurality of sheds 6. Moreover, an overcoat forming method is the same as that of the known methods such as a compression forming, transfer forming, and injection forming.

Figure 1:
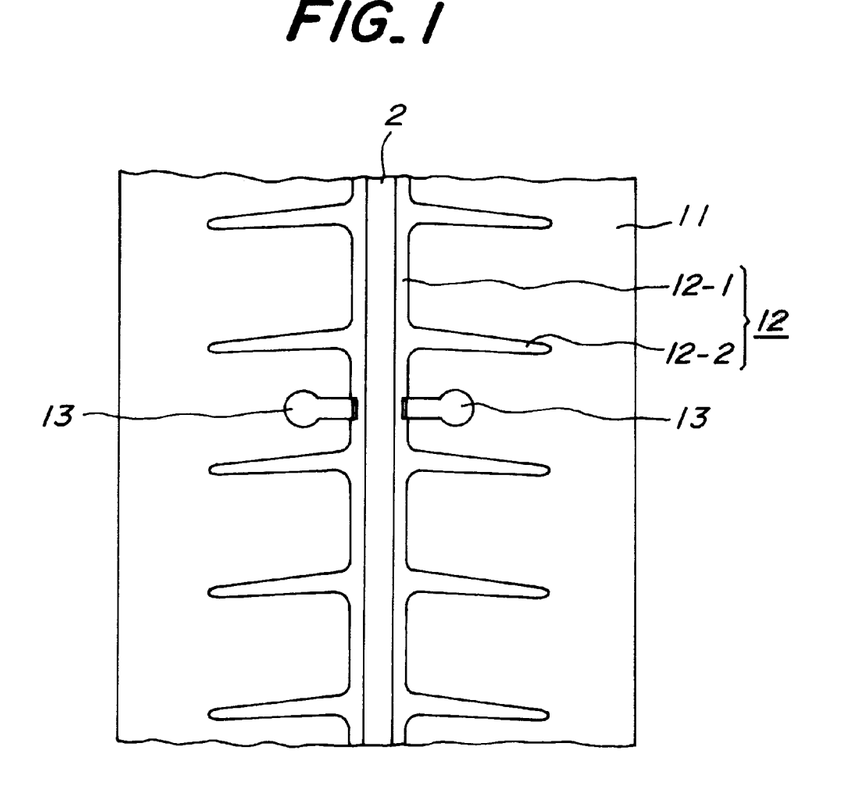
FIG. 1 is a schematic view for explaining a concept of a method of forming an overcoat member of a polymer insulator according to the invention.

The method of forming the overcoat member of the polymer insulator according to the invention has a feature such that a spacer for maintaining a thickness of the sheath portion during a forming operation is arranged to a portion of the metal mold corresponding to the sheath portion. Hereinafter, the present invention will be explained in detail. FIG. 1 is a schematic view for explaining a concept of the method of forming the overcoat member of the polymer insulator according to the invention. In the embodiment shown in FIG. 1, a numeral 11 is a metal mold, and a cavity having a sheath cavity 12-1 for forming the sheath portion 5 and a shed cavity 12-2 for forming the shed 6 is arranged in the metal mold 11. It should be noted that the embodiment shown in FIG. 1 illustrates a figure shown from a partition plane of one of an upper mold and a lower mold.

Figure 2:
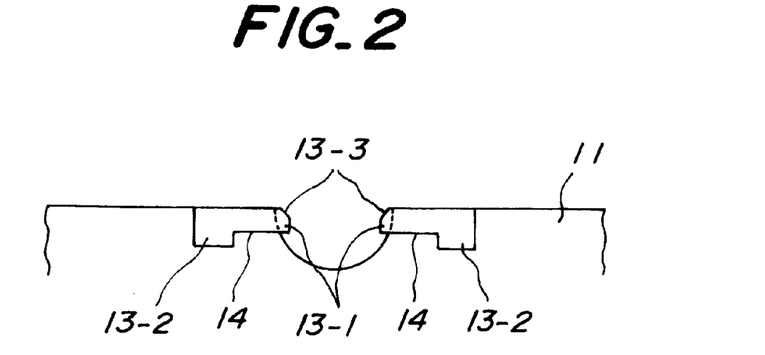
FIG. 2 is a cross sectional view showing a part of a spacer shown in FIG. 1.

Moreover, a numeral 13 is a spacer, in the partition plane shown in FIG. 1, a pair of two spacers 13 are arranged to portions of the metal mold 11 corresponding to the sheath portion. That is to say, as shown in FIG. 2 by a cross sectional view of the spacers 13 shown in FIG. 1, two spacer securing portions 14 are formed in the sheath cavity 12-1 of the metal mold 11 from a plane contacted to the cavity 12, and the spacers 13 are accommodated in the spacer securing portions 14. In this embodiment, two spacers 13 are arranged respectively in both of the upper mold and the lower mold which make up the metal mold 11. Moreover, when accommodating the spacers 13, a horizontal displacement prevention portion 13-2 having a cylindrical shape is formed at a back end of the spacer 13 opposed to the cavity 12, and the horizontal displacement prevention portion 13-2 is installed in a portion of the spacer securing portion 14 corresponding thereto, thereby preventing a positional displacement if the spacer 13 is compressed and deformed.

Figure 3A:
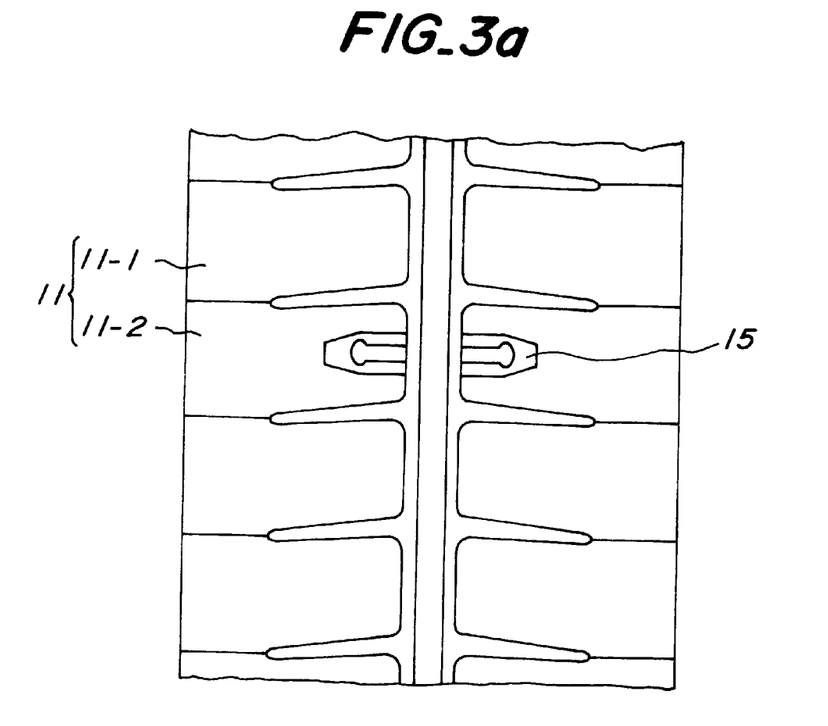
FIGS. 3a and 3b are schematic views for explaining respectively another concept of the method of forming the overcoat member of the polymer insulator according to the invention.
Figure 3B:
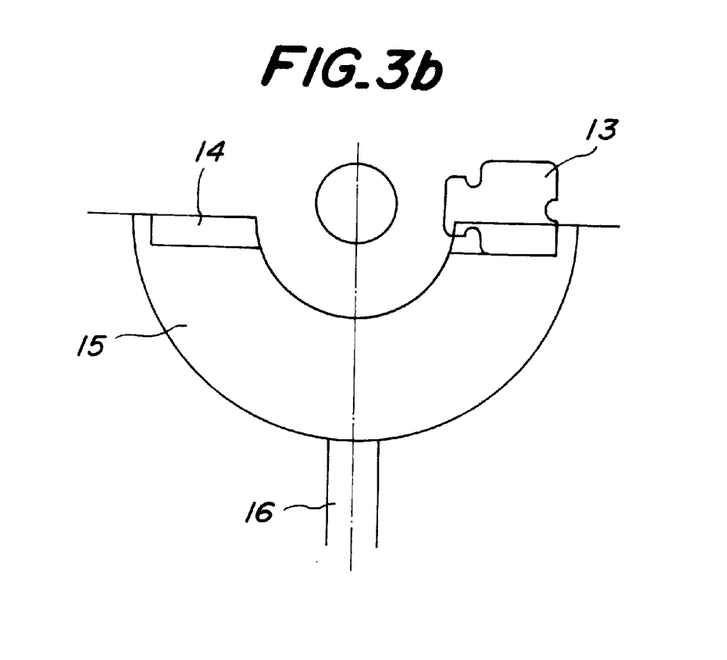

It is not necessary to arrange a pair of the spacers 13 at all the sheath portions between the sheds 6; in the case that a portion of the metal mold 11, at which an eccentric amount of the FRP core 12 is large, is previously known, the spacer 13 is arranged only at that portion; and generally one spacer 13 is arranged for a plurality of the sheath portions 5 (see FIG. 7). Moreover, if an eccentric direction is previously known, the spacer 13 is arranged at either one of the right side or the left side corresponding to the known eccentric direction. Further, as shown in FIGS. 3a and 3b, when use is made of the metal mold 11 in which a plurality of segments 11-1, 11-2 are interlocked, it is preferred that a pair of spacers 13 are arranged at an ejector 15 used for detaching a formed body after a curing operation by moving the sheath portion 5 upward. In this case, it is not necessary to form the spacer securing portion 14 directly to the segment 11-2, and the ejector 15 can be constructed detachably to a projection stem 16. Therefore, various operations such as securing the spacer, increasing or decreasing the number of spacers, securing the spacer at either one of right side or left side corresponding to the eccentric direction, withdrawing the securing operation, and so on, can be performed during the operation only by exchanging or turning the ejector 15, and thus it is a preferred embodiment.

In the embodiments shown in FIGS. 1 and 2, a surface of the spacer 13 is the same plane as that of the partition plane of the metal mold 11 under such a condition that the spacer 13 is secured to the spacer securing portion 14. Therefore, the spacer 13 itself is not deformed even under the condition such that the upper mold and the lower mold are closed. In this case, a corner of a tip portion 13-1 of the spacer 13, to which the FRP core 2 is faced, is constructed as a chamfer portion 13-1, and thus it is possible to prevent a connection failure with the FRP core 2. Then, the tip portion 13-1 of the spacer 13 is projected in the cavity 12-1 by a predetermined amount, and, as a result, it is possible to achieve the construction such that the spacer 13 is projected inward in the sheath cavity 12-1 of the metal mold 11 under the condition such that the metal mold 11 is set by closing the upper mold and the lower mold without deforming the spacer 13 itself. In this case, as a material of the spacer 13, it is possible to use the various known material if it has a certain degree of stiffness, but, in the present invention, it is preferred to used the same rubber as that of the overcoat member 3, since the tip portion 13-1 of the spacer 13 remains as a part of the sheath portion 5 of the overcoat member 3 after the forming operation. The spacer 13 projected from the sheath portion 5 after the forming operation is cut out to obtain the finished polymer insulator.

Figure 4A:
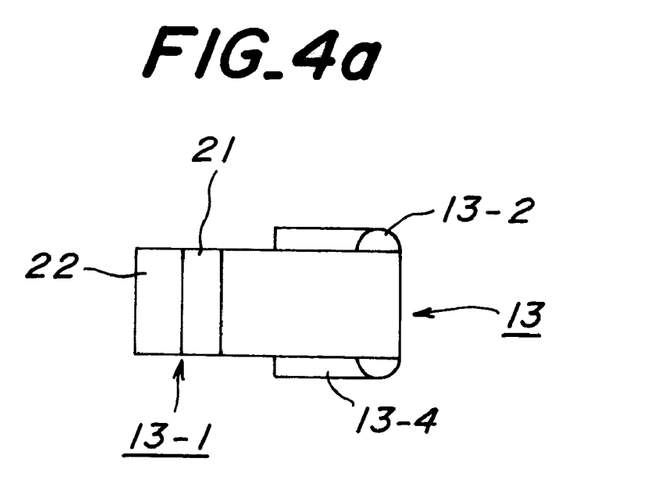
FIGS. 4a–4c are schematic views respectively illustrating another embodiment of the spacer used in the method of forming the overcoat member according to the invention.
Figure 4B:
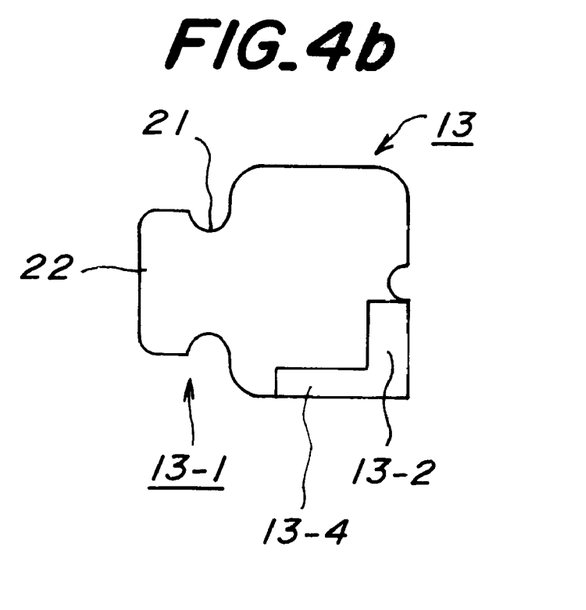
Figure 4C:
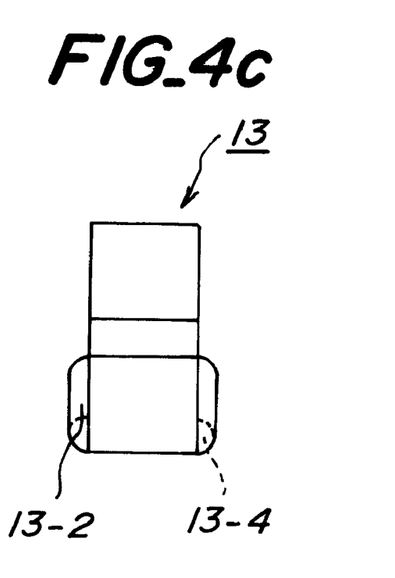

FIGS. 4a–4c are schematic views respectively showing another embodiment of the spacer 13 used in the method of forming the overcoat member of the polymer insulator according to the invention; and FIG. 4a shows its plan view, FIG. 4b illustrates its front view and FIG. 4c depicts its side view. In the spacer 13 shown in FIGS. 4a–4c, different points as compared with the spacer 13 shown in FIGS. 1 and 2 are constructions of the tip portion 13-1 and the horizontal displacement prevention portion 13-2. That is to say, in the spacer 13 shown in FIGS. 4a–4c, the tip portion 13-1 comprises a neck portion 21 and a spacer head 22 expanding from the neck portion 21. Therefore, the spacer head 22 can be waggled. Moreover, the horizontal displacement prevention portion 13-2 is constructed by two cylindrical portions projected at both sides from a main body of the spacer 13, and the two cylindrical portions have a height little smaller than a half of a side surface with taking into consideration of the case such that the spacer is secured to only one of the upper mold and the lower mold. Up-and-down displacement portions 13-3 are also arranged for the same purpose as that of the horizontal displacement prevention portion 13-2.

Figure 5:
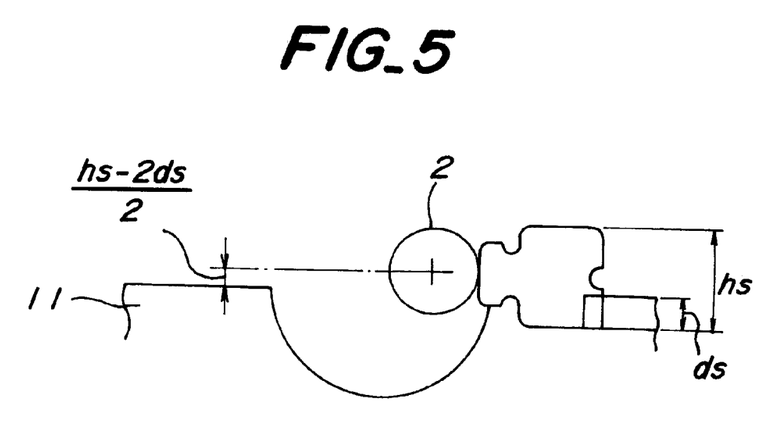
FIG. 5 is a schematic view for explaining a movement of the spacer shown in FIG. 4.

Hereinafter, a movement of the spacer 13 shown in FIG. 4 will be explained with reference to FIG. 5. In the embodiment shown in FIG. 5, if it is assumed that a height of the spacer 13 is hs and a depth of the spacer securing portion 14 arranged in the metal mold 11 or the ejector 15 at the lower mold side is ds (its depth of upper mold side is also ds), a deformation by compression of the spacer 13 starts when the upper mold and the lower mold are gradually closed to a distance of hs-2 ds. From now on, the spacer head 22 starts to intrude into the cavity 12. In this case, a center line of the FRP core 2 having a diameter of D is assumed to be substantially center of the distance (hs-2 ds) between the upper mold and the lower mold, i.e. a position of (hs-2 ds)/2 from a surface of the power mold. That is to say, since the FRP core 2 comes into contact with the spacer 13 at which a last (hs-2 ds)/2 remains in all its descending stroke, the FRP core 2 is contacted to the spacer head 22 in an extreme case such that the FRP core 2 is eccentric, and then the FRP core 2 is moved downward with the spacer head 22, an adhesive film formed by the primer treatment is not damaged due to a rubbing between the surface of the FRP core 2 and the spacer 13. Moreover, since the surface of the FRP core 2 and the spacer 13 are always contacted during the descending stroke of (hs-2 ds)/2 after their contact and since there is the neck portion 21 in the spacer head 22 even if descending speeds of the spacer head 22 and the FRP core 2 are different, it is possible to absorb a deformation of the spacer 13 due to the speed difference by waggling its neck portion 21.

Figure 6:
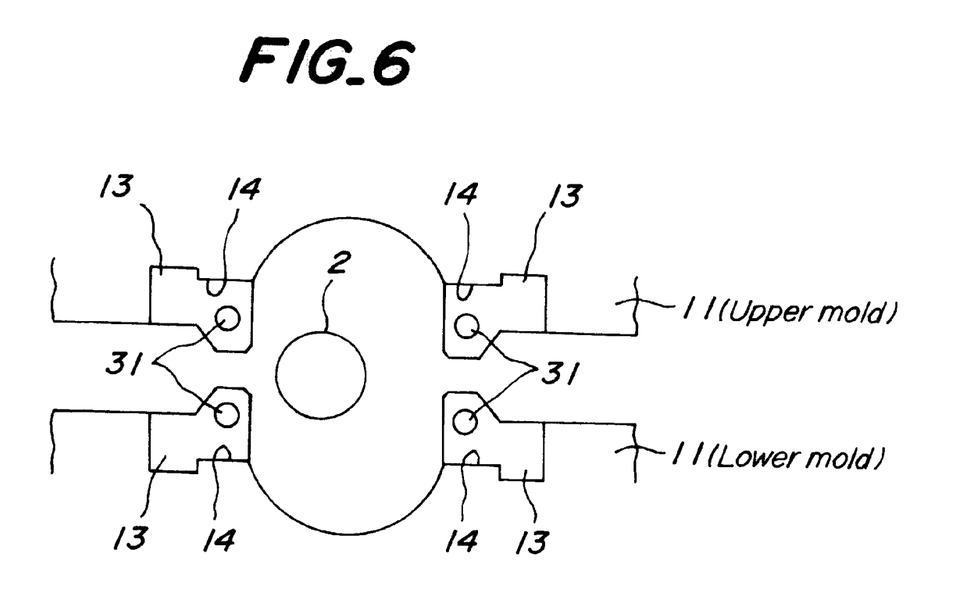
FIG. 6 is a schematic view depicting still another embodiment of the spacer used in the method of forming the overcoat member according to the invention.

FIG. 6 is a schematic view showing still another embodiment of the spacer 13 used in the method of forming the overcoat member of the polymer insulator according to the invention. In the embodiment shown in FIG. 6, four spacers 13 are arranged at respectively two positions in each of the upper mold and the lower mold. An upper end of respective spacers 13 is projected from the partition line of the upper mold or the lower mold under such a condition that respective spacers 13 are secured to the spacer securing portion 14. The spacer 13 is deformed correspondingly by closing gradually the upper mold and the lower mold. In the embodiment shown in FIG. 6, in order to deform the spacer 13 easily, holes 31 for reducing its volume are arranged in respective spacers 13.

As mentioned above, according to the method of forming the overcoat member of the polymer insulator according to the invention using the spacer 13, it is possible to prevent an eccentricity of the FRP core 2 effectively. In this respect, in the case that a sufficient performance can be obtained if a thickness of the sheath portion 5 is actually for example 3 mm, the thickness of the sheath portion 5 is generally designed to be for example 5 mm with taking into consideration of an eccentricity of the FRP core 2. However, in this case, if the present invention is applied, the thickness of the sheath portion 5 can be designed to be 3 mm from the beginning. Moreover, in the present invention, in the case that an eccentric direction of the FRP core 2 with respect to the metal mold 11 is previously known, the spacer 13 is arranged at one side on the partition plane as shown in FIGS. 4a–4c and FIG. 5. In the case that the spacer 13 is arranged at one side as mentioned above, the spacer 13 may be arranged at both of the upper mold and the lower mold, or the spacer 13 may be arranged at only one of the upper mold and the lower mold. Further, in the case that a thickness of the sheath portion 5 is designed to be as thin as possible i.e. it is designed to be 3 mm as shown in the example mentioned above, it is preferred to arrange the spacer 13 at both sides on the partition plane. the spacer 13 may be arranged at only one of the upper mold and the lower mold. Further, in the case that a thickness of the sheath portion 5 is designed to be as thinner as possible i.e. it is designed to be 3 mm as shown in the example mentioned above, it is preferred to arrange the spacer 13 at both sides on the partition plane.

Furthermore, as the forming method which is an object of the present invention, all the forming methods such as transfer forming, injection forming, compression forming and so on can be utilized. Among them, in the transfer forming and the injection forming, it is possible to form the overcoat member under such a condition that a flaw does not occur on a surface of the FRP core 2 and that an eccentricity of the FRP core 2 is prevented, by constructing the spacer 13 in such a manner that a projection amount of the spacer 13 in the cavity 12 is increased and the spacer 13 supports the FRP core 2. Moreover, it is a matter of course that the method of forming the overcoat member of the polymer insulator according to the invention using the spacer 13 is especially effective for preventing the eccentricity in the compression forming.

As is clearly understood from the explanations mentioned above, according to the invention, since the spacer for maintaining a thickness of the sheath portion during a forming operation, which is arranged to a portion of the metal mold corresponding to the sheath portion, which is preferably made of the same rubber as that of the overcoat member, and which is preferably projected inward in a cavity of the metal mold for forming the sheath portion under such a condition that the metal mold is set, can prevent an eccentricity of the core member during a forming operation, it is possible to perform an overcoat member forming under such a condition that a thickness of the sheath portion is maintained constantly even.

What is claimed is:
1. A method of forming an overcoat member of a polymer insulator having a core member, and an overcoat member comprising a sheath portion arranged around the core member and a plurality of sheds, the overcoat member being formed by using a metal mold having upper and lower mold sections, comprise the steps of:

arranging a spacer for maintaining a thickness of the sheath portion during a forming operation at a position in the metal mold corresponding to the sheath portion, the spacer having a spacer head connected thereto by a spacer neck that allows movement of the spacer head; and closing the upper and lower molds gradually to form the overcoat member by compression.

2. The method of forming the overcoat member of the polymer insulator according to claim 1, wherein the spacer is projected inward in a cavity of the metal mold for forming the sheath portion under such a condition that the metal mold is set by closing an upper mold and a lower mold.

3. The method of forming the overcoat member of the polymer insulator according to claim 1, wherein the spacer has a displacement prevention portion for preventing a displacement of the spacer from a sheath forming portion of the metal mold.

4. The method of forming the overcoat member of the polymer insulator according to one of claim 1, wherein the spacer is made of the same rubber as that of the overcoat member.

5. The method of forming the overcoat member of the polymer insulator according to claim 1, wherein, in compression forming, a tip portion of the spacer is moved in response to a moving speed of the core member.

6. The method of forming the overcoat member of the polymer insulator according to claim 2, wherein the spacer has a displacement prevention portion for preventing a displacement of the spacer from a sheath forming portion of the metal mold.

7. The method of forming the overcoat member of the polymer insulator according to claim 2, wherein the spacer is made of the same rubber as that of the overcoat member.

8. The method of forming the overcoat member of the polymer insulator according to claim 3, wherein the spacer is made of the same rubber as that of the overcoat member.

* * * * *